US011986792B2

(12) United States Patent
Hsieh et al.

(10) Patent No.: US 11,986,792 B2
(45) Date of Patent: May 21, 2024

(54) PHOTOCURING DEVICE

(71) Applicant: COSMEX CO. LTD., New Taipei (TW)

(72) Inventors: Wan-Chieh Hsieh, New Taipei (TW); Ya-Wen Wu, New Taipei (TW); Yu-Ching Li, New Taipei (TW); Wen-Shan Chung, New Taipei (TW)

(73) Assignee: COSMEX CO., LTD., New Taipei (TW)

( * ) Notice: Subject to any disclaimer, the term of this patent is extended or adjusted under 35 U.S.C. 154(b) by 793 days.

(21) Appl. No.: 16/951,481

(22) Filed: Nov. 18, 2020

(65) Prior Publication Data

US 2021/0146329 A1 May 20, 2021

(30) Foreign Application Priority Data

Nov. 19, 2019 (TW) .................................. 108215321

(51) Int. Cl.
*B01J 19/12* (2006.01)
*A45D 29/00* (2006.01)
*B29C 35/08* (2006.01)

(52) U.S. Cl.
CPC ............ *B01J 19/123* (2013.01); *A45D 29/00* (2013.01); *B29C 35/08* (2013.01); *B01J 2219/1203* (2013.01)

(58) Field of Classification Search
CPC . B01J 19/125; B01J 2219/1203; B29C 35/08; A45D 29/00
USPC .......................................................... 34/275
See application file for complete search history.

(56) References Cited

U.S. PATENT DOCUMENTS

| | | | | | |
|---|---|---|---|---|---|
| 5,852,879 | A | * | 12/1998 | Schumaier | ................ A61L 2/10 34/80 |
| 7,162,811 | B2 | * | 1/2007 | Delaney | ................. A45D 29/00 34/496 |
| 8,286,643 | B2 | * | 10/2012 | Li | ........................... A45D 29/00 132/73 |
| 8,835,886 | B2 | * | 9/2014 | Vu | ......................... A45D 29/00 34/275 |
| 9,713,371 | B1 | * | 7/2017 | Luu | ........................ A45D 29/00 |
| 9,810,479 | B2 | * | 11/2017 | Haile | ........................ F21V 7/00 |

(Continued)

FOREIGN PATENT DOCUMENTS

| | | | | | |
|---|---|---|---|---|---|
| CN | 108851466 | A | * | 11/2018 | ............. A45D 29/00 |
| TW | 591348 | U | * | 3/2020 | ............. A45D 29/00 |

*Primary Examiner* — Stephen M Gravini
(74) *Attorney, Agent, or Firm* — MUNCY GEISSLER OLDS & LOWE P.C.

(57) ABSTRACT

The present invention provides a photocuring device, comprising a housing and an ultraviolet (UV) light module, wherein the housing comprises an electroluminescent layer and/or a touch layer and a control module connected to the electroluminescent layer and/or the touch layer by an electrical means. The photocuring device of the invention not only features a low material cost and low production cost, but also allows its display interface and/or operation interface to be provided at any position of the housing of the photocuring device, without limitations in size, shape, or angle. Furthermore, the photocuring device of the invention allows its display interface and/or operation interface to be simplified as needed to facilitate operation and viewing by a manicurist or one who is receiving a manicure.

19 Claims, 5 Drawing Sheets

(56) References Cited

U.S. PATENT DOCUMENTS

| | | | |
|---|---|---|---|
| 2015/0082654 A1* | 3/2015 | Jaegal | A45D 29/00 34/275 |
| 2017/0006993 A1* | 1/2017 | Rivero | A45D 29/00 |
| 2021/0146329 A1* | 5/2021 | Hsieh | A45D 29/00 |

* cited by examiner (a)

(b)

(c)

(d)

(e)

(f)

PHOTOCURING DEVICE

BACKGROUND OF THE INVENTION

1. Technical Field

The present invention relates to a photocuring device and more particularly to a photocuring device with a simplified display interface and/or operation interface.

2. Description of Related Art

Nail art has become popular in many countries in recent years. Generally, the curing methods of nail art can be divided into heat curing and photocuring. Heat curing has the disadvantages of slow speed, poor energy efficiency, and long time required; in addition, it will produce bad odors due to solvent volatilization during operation, and may also deform the patterns on the nail surface due to the application of hot air. Therefore, in recent years, the curing method of nail art has been photocuring as the mainstream.

In the process of photocuring the glue applied on the nails, the photocuring device (or machine) must be operated to control the light irradiation process and time to achieve the ideal photocuring effect. Therefore, the machine needs to be designed with an operating interface and a display interface that can be easily operated and viewed by a manicurist or one who is receiving a manicure.

Due to production cost considerations, the operation interface of the conventional photocuring devices is generally implemented as operation press-keys, and the display interface as indicator lights or a display screen. The foregoing configurations, however, make it difficult to elevate the exterior of those devices esthetically. If the operation interface and the display interface are to be integrated into a touch panel, the cost of the resulting devices will be increased significantly.

Moreover, a touch panel as well as a display screen must match in shape and size the location where it is mounted, but it is difficult to make a touch panel or display screen of an irregular or exceptionally large or small shape. A touch panel or display screen must also be planar and therefore tends to have problem adapting to locations with a large curvature. Consequently, a photocuring device not only is subject to design limitations imposed on its shape and size, but also is complicated in terms of manufacture.

BRIEF SUMMARY OF THE INVENTION

To solve the above problems, the primary objective of the present invention is to provide a photocuring device, comprising: a housing, having a side formed at least with a cavity with an opening; and an ultraviolet (UV) light module, provided in an interior of the housing and comprising at least one UV light-emitting unit directed toward the cavity; wherein the housing comprises an electroluminescent layer and/or a touch layer and a control module connected to the electroluminescent layer and/or the touch layer by an electrical means.

In a preferred embodiment, the electrical means includes at least one first conductive layer provided on a bottom side of the electroluminescent layer and at least one second conductive layer provided on a top side of the electroluminescent layer, and the control module is electrically connected to the first conductive layer and the second conductive layer in order to output a signal to the electroluminescent layer.

In a preferred embodiment, the electroluminescent layer includes a semiconductor material or a phosphorescent material in order to enter an electroluminescent output state in response to an electric signal output by the control module.

In a preferred embodiment, the second conductive layer is a transparent or translucent membrane or thin layer.

In a preferred embodiment, the electrical means includes at least one electrode electrically connected to a portion of the touch layer, and the control module is connected to the electrode in order to obtain an electric signal.

In a preferred embodiment, the control module includes a threshold value, and the control module outputs a touch control signal when the electric signal reaches the threshold value.

In a preferred embodiment, the control module controls the photocuring device when the electric signal reaches the threshold.

In a preferred embodiment, the electrical means includes a plurality of electrodes that are electrically connected to a plurality of portions of the touch layer respectively, and the control module is connected to the electrodes in order to obtain a plurality of electric signals.

In a preferred embodiment, the control module derives a location information from the electric signals.

In a preferred embodiment, the control module controls the photocuring device according to the location information.

In a preferred embodiment, the touch layer contains a carbon material.

In a preferred embodiment, the photocuring device further comprises at least one protective layer provided on the electroluminescent layer and/or the touch layer.

In a preferred embodiment, the electroluminescent layer displays operation state or operation information.

In a preferred embodiment, the housing further comprises a display unit displayed face out in the housing, wherein the display unit is at least one selected from the group consisting of touchscreen, a display screen, a numeric display, and indicator lights.

In a preferred embodiment, the touch layer extends over full extent or a portion of the housing.

In a preferred embodiment, the touch layer comprises a plurality of function blocks, wherein each of the function blocks provides one function selected from a group consisting of start-up, stop, set time, time countdown, set light output, and shutdown.

In a preferred embodiment, the photocuring device further comprises an operation unit displayed face out in the housing, wherein the operation unit is at least one selected from a group consisting of press-keys, touch panel, a multi-step/stepless turning knob, a geared knob, a control dial, a translational push lever, a wired or wireless transmission pedal, a touchpad, touch screen, touch button, a microphone, a multi-step/stepless trigger, and a multi-step/stepless regulation pushbutton.

In a preferred embodiment, the electroluminescent layer displays at least one color or mixing color.

In a preferred embodiment, the photocuring device further comprises at least one pattern displayed on full extent or a portion of outer area of the housing.

The photocuring device of the present invention not only features a low material cost and low production cost, but also allows its display interface and/or operation interface to be provided at any position of the housing of the photocuring device, without limitations in size, shape, or angle. Furthermore, the photocuring device of the invention allows its display interface and/or operation interface to be simplified as needed to facilitate operation and viewing by a manicurist or one who is receiving a manicure.

DETAILED DESCRIPTION OF THE INVENTION

The details and technical solution of the present invention are hereunder described with reference to accompanying drawings. For illustrative sake, the accompanying drawings are not drawn to scale. The accompanying drawings and the scale thereof are not restrictive of the invention.

The use of "or" means "and/or" unless stated otherwise. The use of "comprise" means not excluding the presence or addition of one or more other components, steps, operations, and/or elements to the described components, steps, operations, and/or elements. Similarly, "comprise," "comprises," "comprising" "include," "includes," and "including" are interchangeable and not intended to be limiting. The terms "a" and "an" refer to one or to more than one (i.e., to at least one) of the grammatical object of the article.

Hereinafter, the present invention will be further described with detailed description and embodiments. However, it should be understood that these embodiments are only used to facilitate the understanding of the present invention, rather than to limit the scope of the present invention.

As used herein, the term "electrically connected" may involve the use of any direct or indirect electrical connection means that is known to a person of ordinary skill in the art. Such electrical means include but are not limited to connection through a flexible circuit board, electric wires, the wiring on a circuit board, or an electrically conductive coating.

Embodiment 1

Figure 1:
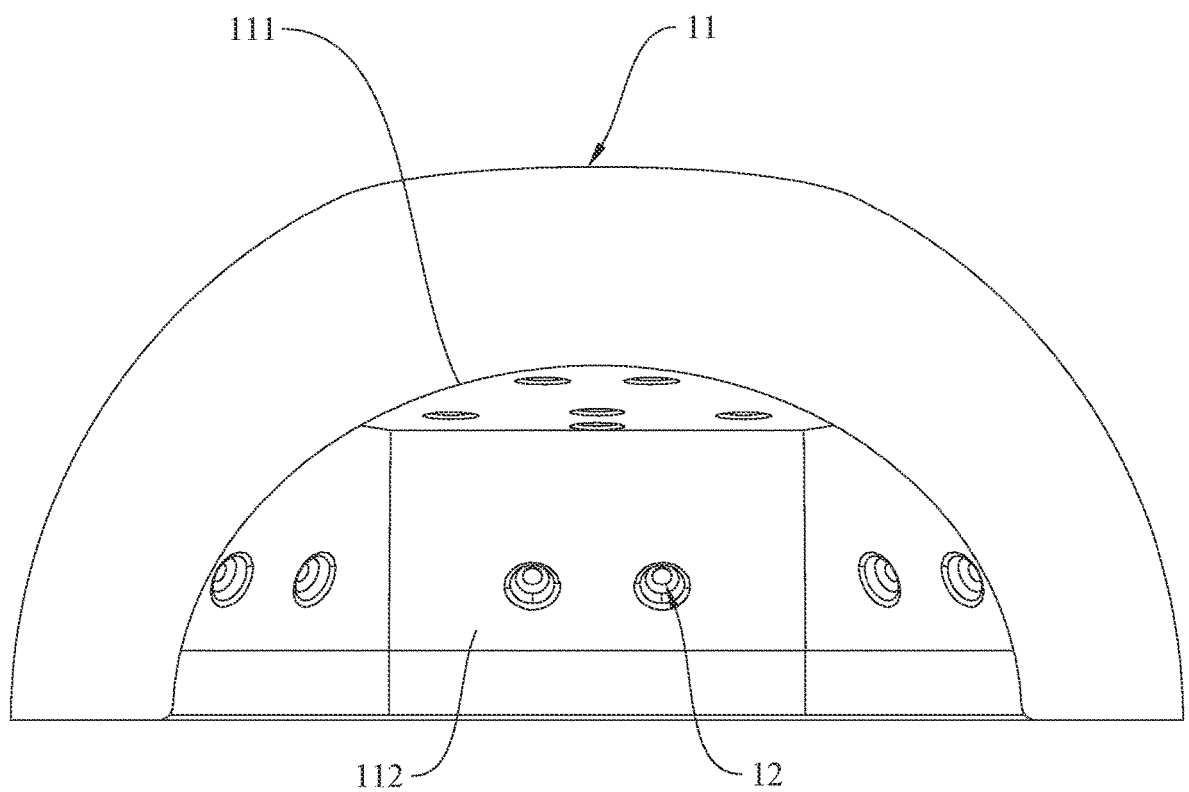
FIG. 1 is a perspective view of the photocuring device according to a preferred embodiment of the present invention.
Figure 2:
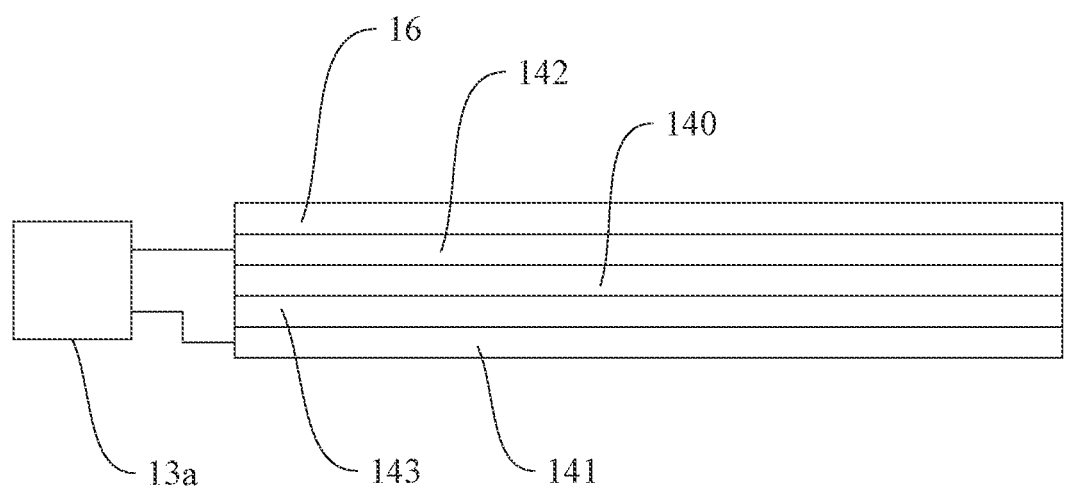
FIG. 2 is a schematic drawing of the electrical means adopted by the electroluminescent layer according to embodiment 1 of the present invention.

Please refer to FIG. 1 and FIG. 2 respectively for a perspective view of the photocuring device 100 according to a preferred embodiment of the present invention and a schematic drawing of the electrical means adopted by the photocuring device.

The photocuring device 100 according to this embodiment includes a housing 11 and an ultraviolet (UV) light module 12. The housing 11 includes an electroluminescent layer 140 and a control module 13a directly or indirectly connected to the electroluminescent layer 140 by an electrical means. The housing 11 may also include a protective layer 16 as its outermost layer. The housing 11 may also comprise at least one LED light (not shown) providing different color lights, which decorates the photocuring device 100.

One side of the housing 11 is formed at least with a cavity 112 with an opening 111. The housing 11 serves to support and secure the entire structure of the photocuring device 100 and prevent the light emitted by UV light module 12 from leaking out considerably. The housing 11 may also include a supporting structure therein for supporting the UV light module 12 at a preferred irradiation position, e.g., a position corresponding to the fingernails or toenails placed in the cavity 112. Furthermore, the housing 11 comprises a display unit displayed face out in the housing 11, wherein the display unit is at least one selected from the group consisting of touchscreen, a display screen, a numeric display, and indicator lights.

The UV light module 12 is provided in the interior of the housing 11 and includes at least one UV light-emitting unit directed toward the cavity 112. The UV light-emitting unit may be any light-emitting unit capable of emitting UV light, such as but not limited to a UV lamp, a UV light-emitting diode (LED), a cold cathode fluorescent lamp (CCFL), or a combination of the above. In one preferred embodiment, the UV light-emitting unit emits light whose wavelength is (or whose wavelengths are) in the range of 350~450 nm. The UV light-emitting unit may emit light of a single wavelength or of different wavelengths that pertain to multiple wavebands respectively.

The control module 13a includes a control circuit board for controlling the UV light module 12 and preferably also includes an operation unit to be operated by a user. The operation unit is exposed from the housing 11 so that a user can operate the operation unit with ease. The operation unit may be, but is not limited to, press-keys, a touch panel, a multi-step/stepless turning knob, a geared knob, a control dial, a translational push lever, a wired or wireless transmission pedal, a touchpad, touch screen, touch button, a microphone, a multi-step/stepless trigger, a multi-step/stepless regulation pushbutton and/or a touch layer (as in embodiment 3).

The electrical means for directly or indirectly connecting the control module 13a to the electroluminescent layer 140 includes at least one first conductive layer provided on the bottom side of the electroluminescent layer 140 (i.e. conductive layer 141 in FIG. 2) and at least one second conductive layer provided on the top side of the electroluminescent layer 140 (i.e. conductive layer 142 in FIG. 2). The control module 13a is connected to the first conductive layer and the second conductive layer in order to output a signal to the electroluminescent layer 140, and the electroluminescent layer 140 will enter an electroluminescent output state in response to the electric signal output by the control module 13a. More specifically, the housing 11 includes, sequentially in an inside-to-outside direction, a first conductive layer 141, a dielectric layer 143, the electroluminescent layer 140, and a second conductive layer 142 (see FIG. 2), with the first conductive layer 141 including at least one first electrode, and the second conductive layer 142 including at least one second electrode. In this embodiment, the layered structure described above is referred to as an electroluminescent module 14. The protective layer 16 may be provided on the outer side of the electroluminescent module 14. The different layers of the electroluminescent module 14 are preferably provided by a coating or spray coating means, but the present invention has no limitation in this regard. The electroluminescent layer 140 displays operation state or operation information.

The electroluminescent layer 140 is a membrane layer that can enter a light-emitting state by the principle of electroluminescence. In one preferred embodiment, the electroluminescent layer is formed by adding an electroluminescent material into a polymer substrate. The aforementioned polymer substrate may involve the use of organic materials or inorganic materials, or a mixed material of organic materials and inorganic materials; for example, but not limited to, polymers with relatively high dielectric constant such as cyanoethyl cellulose resin, polyethylene, polypropylene, polystyrene resin, polystyrene-acrylic resin, organic silicon resin, epoxy resin, vinylidene fluoride resin, aromatic polyamide, polybenzimidazole, siloxane resin, polyvinyl alcohol, vinyl resins such as polyvinyl butyral resin, phenol-formaldehyde resin, novolac resin, acrylic resin, melamine resin, polyurethane resin or oxazole resin (polybenzoxazole). In one preferred embodiment, the electroluminescent layer includes an electroluminescent material such as a semiconductor material or a phosphorescent material in order to enter an electroluminescent output state in response to the electric signal output by the control module. The aforesaid electroluminescent material may be, but is not limited to, a zinc sulfide doped with a metal (e.g., quantum dots of at least one of manganese, copper, silver, and aluminum), blue diamond (which contains boron), gallium arsenide, rubrene, or 9,10-diphenylanthracene. As the electroluminescent material will influence the color of the light emitted (for example, a manganese-doped zinc sulfide contributes to the emission of yellowish orange light, a manganese-doped zinc sulfide plus a filter contributes to the emission of yellowish green light, a samarium chloride-doped zinc sulfide contributes to the emission of red light, a terbium fluoride-doped zinc sulfide contributes to the emission of green light, a thullium fluoride-doped zinc sulfide contributes to the emission of blue light, and a cerium-doped strontium sulfide contributes to the emission of bluish green light), a technician may choose a proper electroluminescent material according to practical needs. In one preferred embodiment, the photocuring device has only one electroluminescent layer. In another preferred embodiment, the photocuring device has a plurality of electroluminescent layers, which can be excited respectively into electroluminescent states of different light colors and eventually bring about a mixed-color electroluminescent output state. The electroluminescent layer 140 displays at least one color or mixing color.

Figure 5:
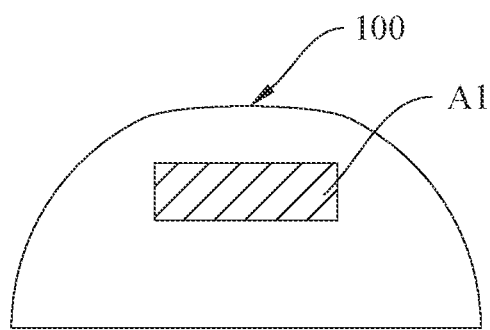
FIG. 5 shows the locations of the electroluminescent module and/or the touch control module according to preferred embodiments of the present invention.
Figure 5:
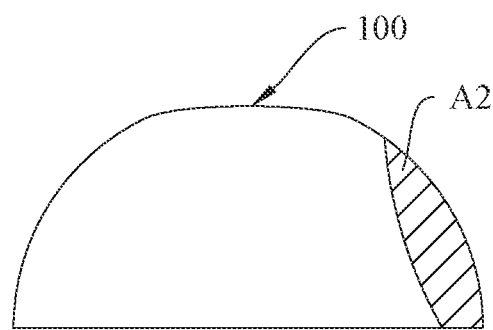
Figure 5:
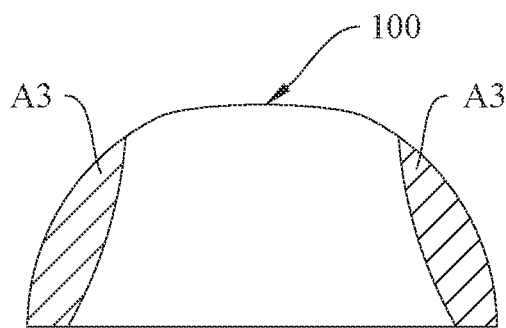
Figure 5:
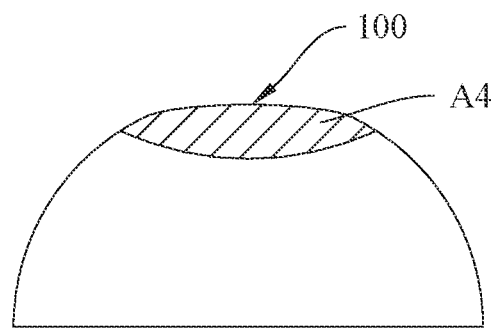
Figure 5:
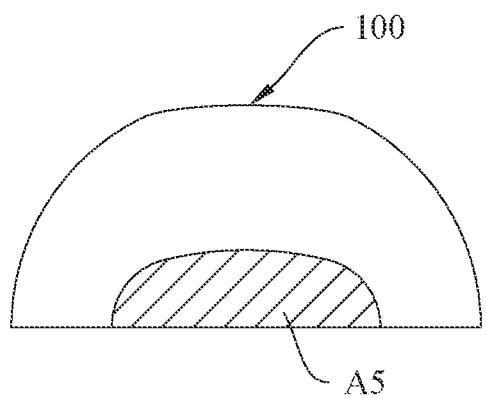
Figure 5:
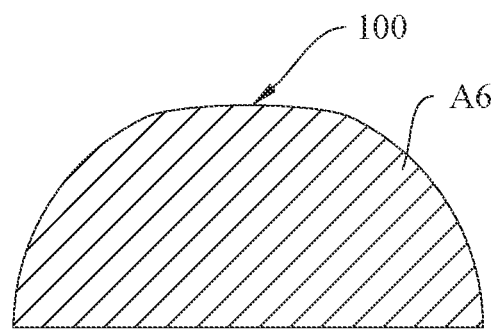

The electroluminescent layer 140 may be provided at any position of the housing 11 as needed (see FIG. 5). The electroluminescent layer 140 may extend over the full extent or only a portion of the housing 11 or be in a patterned form; the present invention has no limitation in this regard. In one preferred embodiment, the electroluminescent layer 140 is configured to display operational information regarding a user's operation (e.g., the time, in seconds, for which the photocuring device has been in operation). In another preferred embodiment, the electroluminescent layer 140 is configured to display the operation state of the UV light module (e.g., having started or stopped irradiation), and this embodiment is advantageous in that even when the operator (e.g., a manicurist) is not facing the opening of the housing, the current operation state of the UV light module can be rapidly known by way of the electroluminescent output state of the electroluminescent layer 140, without the operator moving themselves or the photocuring device; thus, the photocuring device provides convenience of use. It is also feasible for the photocuring device to have both the electroluminescent layer 140 and a other display unit (e.g., a touchscreen, a display screen, a numeric display, indicator lights, or a combination of the above).

The first conductive layer is formed of an electrically conductive material and forms a contour in the electroluminescent output state. Preferably, the first conductive layer is in the form of a membrane or a thin layer, such as but not limited to a metal plating layer, an electrically conductive metal paint, or an electrically conductive polymer paint. As shown in FIG. 2, the dielectric layer 143 is provided between the first conductive layer 141 and the electroluminescent layer 140 to achieve the desired dielectric constant. The dielectric layer 143 may include high dielectric constant materials such as but not limited to zirconia, magnesia, alumina, titania, ceria, yttria, silicon oxide ($SiO_x$), silicon nitride ($SiN_x$), silicon containing oxygen and nitrogen, aluminum nitride (AlN), aluminum containing oxygen and nitrogen, barium titanate ($BaTiO_3$), strontium titanate ($SrTiO_3$), lead titanate ($PbTiO_3$), potassium niobate ($KNbO_3$), lead niobate ($PbNbO_3$), tantalum oxide ($Ta_2O_5$), barium tantalate ($BaTa_2O_6$) or lithium tantalate ($LiTaO_3$).

The second conductive layer is also formed of an electrically conductive material and is preferably in the form of a generally transparent or translucent membrane or thin layer. Preferably, the second conductive layer has a light permeability of at least 20%, such as but not limited to more than 20%, more than 30%, more than 40%, more than 50%, more than 60%, more than 70%, more than 80%, more than 90% or about 100%, with regard to visible light (whose wavelength ranges from 380 to 780 nm). Preferred materials for the second conductive layer include, but are not limited to, conductive polymer, carbon nanotube, graphene, silver nanowire or indium tin oxide (ITO), fluorine-doped tin oxide (FTO), zinc oxide, antimony-doped tin dioxide (ATO) and other metal oxides. The material of the second conductive layer and the material of the first conductive layer can be the same or different, and a technician can make adjustments as required.

The protective layer 16 is optional and may be provided as needed. Preferably, the protective layer 16 is provided as the outermost layer of the housing 11 to protect the housing 11 from damage by detergent and/or the various solvents used in manicure, or more particularly to protect the membrane layers (e.g., the electroluminescent layer 140 and the conductive layers) of the housing 11 from damage. The protective layer 16 is preferably formed of a transparent insulating polymer with a proper hardness. In one preferred embodiment, the protective layer 16 is a colored membrane layer so that the electroluminescent layer 140 and the protective layer 16 can produce various visual effects when the electroluminescent layer 140 emits light. In one preferred embodiment, the protective layer 16 has a thickness not greater than 5 mm. In one preferred embodiment, the protective layer 16 has a structure for enhancing the photocuring device esthetically.

Furthermore, the photocuring device 100 comprises an operation unit displayed face out in the housing 11, wherein the operation unit is at least one selected from a group consisting of press-keys, touch panel, a multi-step/stepless turning knob, a geared knob, a control dial, a translational push lever, a wired or wireless transmission pedal, a touchpad, touch screen, touch button, a microphone, a multi-step/stepless trigger, and a multi-step/stepless regulation pushbutton.

Furthermore, the photocuring device 100 comprises at least one pattern displayed on full extent or a portion of outer area of the housing 11.

The photocuring device of this embodiment involves the use of the electroluminescent layer as a display interface to be provided at any position of the housing, without limitations in size, shape, or angle. Furthermore, the display interface can be simplified as needed to facilitate operation and viewing by a manicurist or one who is receiving a manicure.

Embodiment 2

Figure 3:
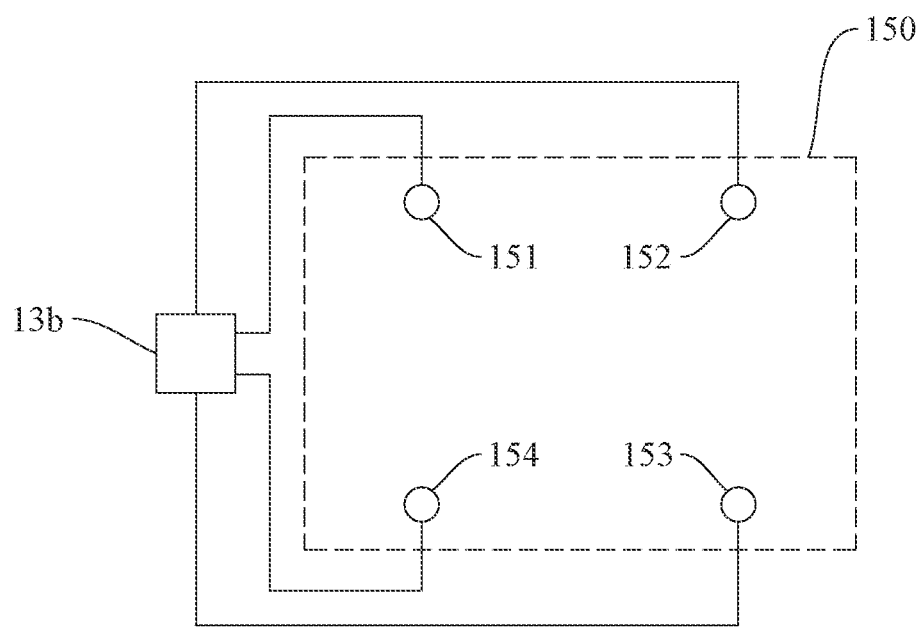
FIG. 3 is a schematic drawing of the electrical means adopted by the touch layer according to embodiment 2 of the present invention.

Please refer to FIG. 1 and FIG. 3 respectively for a perspective view of the photocuring device 100 according to another preferred embodiment of the present invention and a schematic drawing of the electrical means adopted by this photocuring device.

The photocuring device 100 according to this embodiment includes a housing 11 and a UV light module 12, both of which are identical to their counterparts in embodiment 1. Embodiment 2 further includes a touch layer 150 and a control module 13b connected to the touch layer 150 by an electrical means, wherein the touch layer 150 is included in the housing 11. The control module 13b includes a control circuit board for controlling the UV light module 12. Embodiment 2 may also include a protective layer (not shown) as needed.

The touch layer 150 in the present invention involves electric sensing and achieves interaction in a free space. For example, when a user's body part enters the sensing area, the electric current distribution in the electric field in the sensing area will be interfered with by the body part, which can be viewed as a large electric charge absorber, so the location of the body part can be determined by measuring the electric current distribution with an electrode. The electrical means for connecting the touch layer 150 to the control module 13b includes at least one electrode electrically connected to a portion of the touch layer, and the control module is connected to the electrode in order to obtain an electric signal. The number of electrodes can also be 2 or more, such as but not limited to 2, 3, 4, 5, 6, 7, 8, 9, 10, 11, 12, 13, 14, 15, 16, 32 or more than 32, etc. In addition, the at least one electrode may be provided anywhere on the touch layer in a uniform or non-uniform arrangement. A technician will be able to decide the number and location(s) of the at least one electrode required to achieve the desired touch position locating effect.

In this embodiment, a first electrode 151, a second electrode 152, a third electrode 153, and a fourth electrode 154 are electrically connected to four portions of the touch layer 150 respectively (see FIG. 3), and the resulting assembly is referred to as the touch control module 15 in this embodiment. The control module 13b is electrically connected to the first electrode 151, the second electrode 152, the third electrode 153, and the fourth electrode 154 in order to obtain an electric signal. The control module 13b includes a threshold value, which is a value preset by a technician to define the untouched state of the touch layer 150. The same pair of electrodes or the other pair of electrodes are used to measure the electric signal of the touch layer 150 and thereby produce a measurement value, which is then compared with the preset threshold value. The control module 13b outputs a touch control signal when the electric signal reaches the threshold value. The control module 13b, therefore, can control the photocuring device 100 according to the reached threshold value. In another preferred embodiment, the electrical means includes a plurality of electrodes that are electrically connected to a plurality of portions of the touch layer 150 respectively, and the control module 13b is connected to the electrodes in order to obtain a plurality of electric signals. The control module 13b can derive a location information from the electric signals and control the photocuring device 100 according to the location information. The means for deriving the location information includes, for example, obtaining the measurement data at each adjacent pair of electrodes, reconstructing the electric field distribution with the measurement data, determining the finger contact position according to the reconstructed electric field distribution, and creating a reconstructed touch sensing image.

More specifically, and by way of example, the housing 11 of the photocuring device 100 is coated or spray-coated, either entirely or partially, with the touch layer 150, and a plurality of electrodes are electrically connected to proper portions of the touch layer 150 respectively. Following that, the location information and/or the reached threshold of each portion of the touch layer 150 at which a function is to be defined are obtained, and each function of the photocuring device 100 that is to be triggered by one of the aforesaid portions of the touch layer 150 is set. Parameters and functions corresponding to intermittent finger taps or sustained finger presses may also be set. Then, the control module 13b will be able to control the photocuring device 100 according to the reached threshold value and/or the location information. It is also feasible for the photocuring device to have both the touch layer 150 and a conventional operation unit (e.g., press-keys, a touch panel, or a combination of the above). The touch layer 150 extends over full extent or a portion of the housing 11. The touch layer 150 comprises a plurality of function blocks, wherein each of the function blocks provides one function selected from a group consisting of start-up, stop, set time, time countdown, set light output, and shutdown.

The touch layer 150 is a membrane or thin layer containing an electrically conductive material. In one preferred embodiment, the touch layer 150 contains a carbon material. In one preferred embodiment, the touch layer 150 contains an electrically conductive carbon material such as carbon black, graphite, carbon nanotubes, graphene, or carbon fiber. In one preferred embodiment, the touch layer 150 is formed by adding a carbon material into a polymer substrate. The aforementioned polymer substrate may involve the use of organic materials or inorganic materials, or a mixed material of organic materials and inorganic materials; for example, but not limited to, polymers with relatively high dielectric constant such as cyanoethyl cellulose resin, polyethylene, polypropylene, polystyrene resin, polystyrene-acrylic resin, organic silicon resin, epoxy resin, vinylidene fluoride resin, aromatic polyamide, polybenzimidazole, siloxane resin, polyvinyl alcohol, polyvinyl butyral resin and other vinyl resins, phenol-formaldehyde resin, novolac resin, acrylic resin, melamine resin, polyurethane resin or oxazole resin (polybenzoxazole). In a preferred embodiment, the touch layer 150 includes a carbon-containing thermoplastic polymer, a carbon-containing silicone resin, or a carbon-containing polymer foil.

The touch layer 150 may be provided with the aforesaid protective layer in order for the protective layer to protect the touch layer 150 and the electrodes from damage. Or, the outer side of the touch layer 150 may be provided with a thin layer such as a coating, fabric, or paper to meet esthetic requirements.

The photocuring device of this embodiment involves the use of the touch control module as an operation interface. It not only features a low material cost and low production cost, but also simplifies the setting of the operation interface so that the operation interface can be provided at any position of the housing of the photocuring device, without limitations in size, shape, or angle.

Embodiment 3

Figure 4:
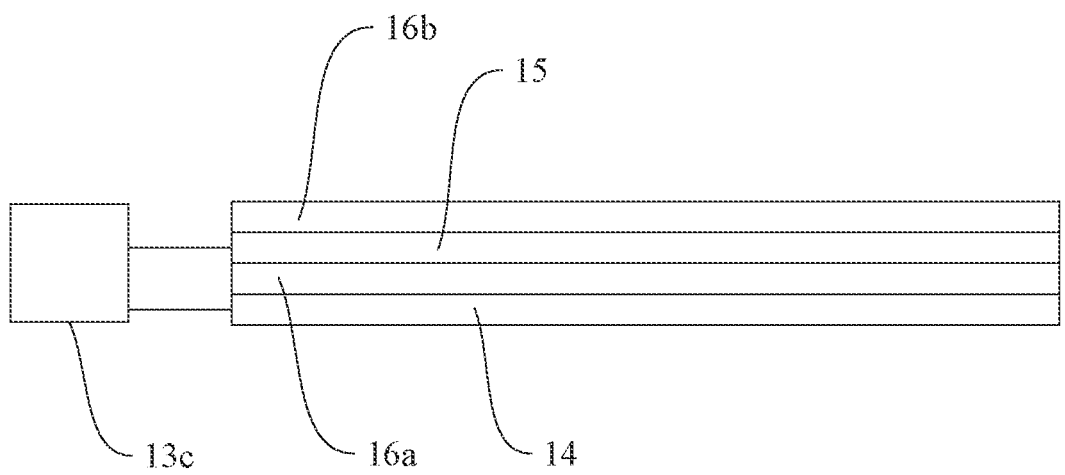
FIG. 4 is a schematic drawing of the electrical means adopted by the electroluminescent layer and the touch layer according to embodiment 3 of the present invention.

Please refer to FIG. 1, FIG. 4, and FIG. 5 respectively for a perspective view of the photocuring device 100 according to yet another preferred embodiment of the present invention, a schematic drawing of the electrical means adopted by this photocuring device, and schematic drawings showing possible locations of the electroluminescent module 14 and/or the touch control module 15.

The photocuring device 100 according to this embodiment includes a housing 11 and a UV light module 12, both of which are identical to their counterparts in embodiment 1. Embodiment 3 is different from the previous embodiments in that the photocuring device, or more particularly the housing 11, includes both the electroluminescent module 14 and the touch control module 15. The control module 13c in this embodiment is electrically connected to the electroluminescent module 14 and the touch control module 15 by an electrical means. If necessary, embodiment 3 may also include a plurality of protective layers 16a and 16b.

As shown in FIG. 4, the touch control module 15 (which includes the touch layer 150 and the first to the fourth electrodes 151 to 154 in embodiment 2, with the first to the fourth electrodes 151 to 154 electrically connected to four portions of the touch layer 150 respectively) is provided on the electroluminescent module 14 (which includes the first conductive layer 141, the dielectric layer 143, the electroluminescent layer 140, and the second conductive layer 142 in embodiment 1), the protective layer 16a is provided between the electroluminescent module 14 and the touch control module 15, and the protective layer 16b is provided on the top side of the touch control module 15. The protective layer 16a may be an insulating layer or anti-interfere layer; the present invention has no limitation. Thus, the control module 13c can control the photocuring device 100 according to the aforesaid reached threshold values and/or location information, and the electroluminescent module 14 can be designed to display operation information regarding a user's operation (e.g., the time, in seconds, for which the photocuring device has been in operation) and/or the operation state of the UV light module 12 (e.g., having started or stopped irradiation) such that the photocuring device 100 according to this embodiment features electroluminescent output as well as touch-controlled input.

The electroluminescent module 14 and/or the touch control module 15 may be provided at any position of the photocuring device 100. In one preferred embodiment, the electroluminescent module 14 and/or the touch control module 15 extends over the full extent or only a portion of the housing 11 of the photocuring device. In one preferred embodiment, the electroluminescent module 14 and the touch control module 15 extend over the full extent or only a portion of the housing 11 of the photocuring device and are provided at the same position. In one preferred embodiment, the electroluminescent module 14 and the touch control module 15 extend over the full extent or only a portion of the housing 11 of the photocuring device and are provided at different positions respectively. In one preferred embodiment, the electroluminescent module 14 and the touch control module extend 15 over the full extent or only a portion of the housing 11 of the photocuring device and overlap each other partially. FIG. 5(a) to FIG. 5(f) show some examples of the locations of the electroluminescent module 14 and/or the touch control module 15, with the hatched areas in the drawings representing the electroluminescent module 14 and/or the touch control module 15. More specifically, the electroluminescent module 14 and/or the touch control module 15 may be provided in an upper region A1 on the back of the photocuring device 100 (see FIG. 5(a)), a lateral region A2 of the photocuring device 100 (see FIG. 5(b)), two lateral regions A3 of the photocuring device 100 respectively (see FIG. 5(c)), a top region A4 of the photocuring device 100 (see FIG. 5(d)), a lower region A5 on the back of the photocuring device 100 (see FIG. 5(e)), or a region A6 covering the entire photocuring device 100 (see FIG. 5(f)); the present invention has no limitation in this regard. In one preferred embodiment, the electroluminescent module 14 and/or the touch control module 15 is in a patterned form and extends over the full extent or only a portion of the housing 11.

According to the above, the photocuring device of the present invention allows its display interface and/or operation interface to be provided at any position of the housing, without limitations in size, shape, or angle, and be simplified as needed to facilitate operation and viewing by a manicurist or one who is receiving a manicure. In addition to having a low material cost and low production cost, the photocuring device is advantageous in that it is lightweight, has a small thickness, is easy to assemble, does not generate much heat, is resistant to vibration and impact, has low power consumption, and is water-resistant.

The above is the detailed description of the present invention. However, the above is merely the preferred embodiment of the invention and cannot be the limitation to the implement scope of the invention, which means the variation and modification according to the invention may still fall into the scope of the invention.

What is claimed is:

1. A photocuring device, comprising:
   a housing, having a side formed at least with a cavity with an opening; and
   an ultraviolet (UV) light module provided in an interior of the housing and comprising at least one UV light-emitting unit directed toward the cavity;
   wherein the housing comprises an electroluminescent layer and/or a touch layer and a control module connected to the electroluminescent layer and/or the touch layer electrically in which the housing is coated or spray-coated with the electroluminescent layer and/or the touch layer.

2. The photocuring device of claim 1, wherein at least one first conductive layer is provided on a bottom side of the electroluminescent layer and at least one second conductive layer provided on a top side of the electroluminescent layer, and the control module is electrically connected to the first conductive layer and the second conductive layer in order to output a signal to the electroluminescent layer.

3. The photocuring device of claim 2, wherein the electroluminescent layer includes a semiconductor material or a phosphorescent material in order to enter an electroluminescent output state in response to an electric signal output by the control module.

4. The photocuring device of claim 2, wherein the second conductive layer is a transparent or translucent membrane or thin layer.

5. The photocuring device of claim 1, wherein at least one electrode is electrically connected to a portion of the touch layer, and the control module is connected to the electrode in order to obtain an electric signal.

6. The photocuring device of claim 5, wherein the control module includes a threshold value, and the control module outputs a touch control signal when the electric signal reaches the threshold value.

7. The photocuring device of claim 6, wherein the control module controls the photocuring device when the electric signal reaches the threshold value.

8. The photocuring device of claim 1, wherein a plurality of electrodes are electrically connected to a plurality of portions of the touch layer respectively, and the control module is connected to the electrodes in order to obtain a plurality of electric signals.

9. The photocuring device of claim 8, wherein the control module derives a location information from the electric signals.

10. The photocuring device of claim 9, wherein the control module controls the photocuring device according to the location information.

11. The photocuring device of claim 1, wherein the touch layer contains a carbon material.

12. The photocuring device of claim 1, further comprising at least one protective layer provided on the electroluminescent layer and/or the touch layer.

13. The photocuring device of claim 1, wherein the electroluminescent layer displays operation state or operation information.

14. The photocuring device of claim 1, wherein the housing further comprises a display unit displayed face out in the housing, wherein the display unit is at least one selected from the group consisting of touchscreen, a display screen, a numeric display, and indicator lights.

15. The photocuring device of claim 1, wherein the touch layer extends over full extent or a portion of the housing.

16. The photocuring device of claim 1, wherein the touch layer comprises a plurality of function blocks, wherein each of the function blocks provides one function selected from a group consisting of start-up, stop, set time, time countdown, set light output, and shutdown.

17. The photocuring device of claim 1, further comprises an operation unit displayed face out in the housing, wherein the operation unit is at least one selected from a group consisting of press-keys, touch panel, a multi-step/stepless turning knob, a geared knob, a control dial, a translational push lever, a wired or wireless transmission pedal, a touchpad, touch screen, touch button, a microphone, a multi-step/stepless trigger, and a multi-step/stepless regulation push-button.

18. The photocuring device of claim 1, wherein the electroluminescent layer displays at least one color or mixing color.

19. The photocuring device of claim 1, further comprises at least one pattern displayed on full extent or a portion of outer area of the housing.

* * * * *